US011231828B2

(12) United States Patent
Xing et al.

(10) Patent No.: US 11,231,828 B2
(45) Date of Patent: Jan. 25, 2022

(54) SMART GLOBE AND CONTROL METHOD THEREFOR

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/905,028

(22) Filed: Jun. 18, 2020

(65) Prior Publication Data
US 2021/0208764 A1 Jul. 8, 2021

(30) Foreign Application Priority Data
Jan. 7, 2020 (CN) .......................... 202010015242.3

(51) Int. Cl.
G06F 3/0488 (2013.01)
G06F 3/0481 (2013.01)
G06F 3/0484 (2013.01)
G03B 21/56 (2006.01)
G06F 3/01 (2006.01)
G06F 3/16 (2006.01)
G09B 27/08 (2006.01)

(52) U.S. Cl.
CPC ....... *G06F 3/04815* (2013.01); *G03B 21/562* (2013.01); *G06F 3/017* (2013.01); *G06F 3/0488* (2013.01); *G06F 3/04883* (2013.01); *G06F 3/167* (2013.01); *G09B 27/08* (2013.01); *G06F 2203/04806* (2013.01)

(58) Field of Classification Search
None
See application file for complete search history.

(56) References Cited

U.S. PATENT DOCUMENTS

| 6,409,351 | B1* | 6/2002 | Ligon | G02B 13/06 |
| | | | | 353/98 |
| 10,671,241 | B1* | 6/2020 | Jia | G09B 5/02 |
| 10,778,966 | B2* | 9/2020 | Ha | H04N 13/30 |
| 2010/0020026 | A1* | 1/2010 | Benko | G06F 3/04883 |
| | | | | 345/173 |
| 2010/0182145 | A1* | 7/2010 | Ungari | G09B 29/10 |
| | | | | 340/539.13 |

(Continued)

FOREIGN PATENT DOCUMENTS

GB 2378305 A 2/2003
TW 201743303 A 12/2017

OTHER PUBLICATIONS

Extended European Search Report in Application No. 20185841.2, dated Dec. 21, 2020.

*Primary Examiner* — Jordany Nunez
(74) *Attorney, Agent, or Firm* — Syncoda LLC; Feng Ma

(57) ABSTRACT

A smart globe includes: a sphere having a hollow interior; a projection module configured to form a projection image on an inner surface of the sphere; and a processor electrically coupled to the projection module and configured to control the projection module based on received location information, to have the projection module display geographic information corresponding to the location information. User interact with the globe can be realized through physical operations of the smart globe.

17 Claims, 12 Drawing Sheets

(56) References Cited

U.S. PATENT DOCUMENTS

| | | |
|---|---|---|
| 2011/0199286 A1 | 8/2011 | Dziama |
| 2015/0286185 A1* | 10/2015 | Kim .................... G03H 1/2294 |
| | | 359/9 |
| 2017/0084205 A1* | 3/2017 | Sigelagelani ............ G09B 1/00 |
| 2018/0154513 A1* | 6/2018 | Kou ....................... H04R 1/028 |
| 2019/0103075 A1* | 4/2019 | Magi .................... G06F 3/1446 |
| 2019/0147657 A1* | 5/2019 | Kumar ................... G06T 15/10 |
| | | 345/419 |

\* cited by examiner

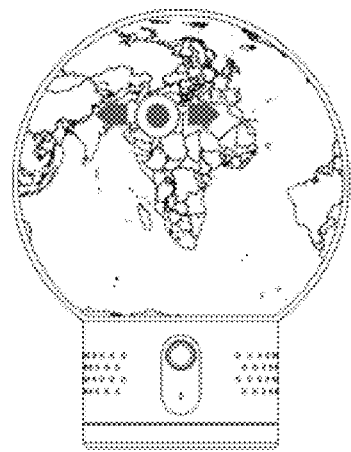 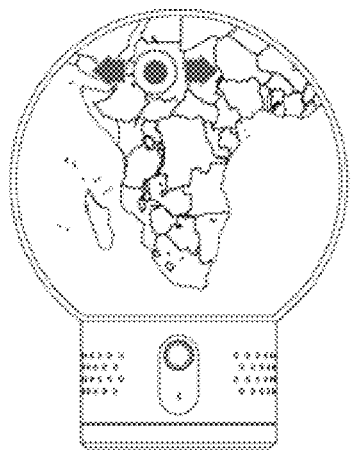 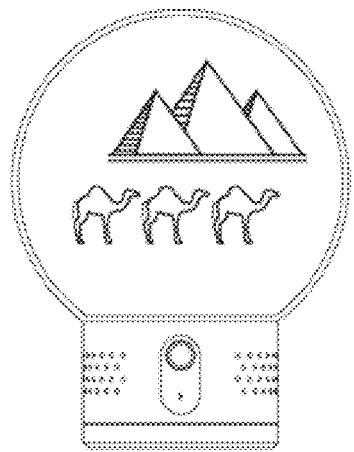
FIG. 6A          FIG. 6B          FIG. 6C
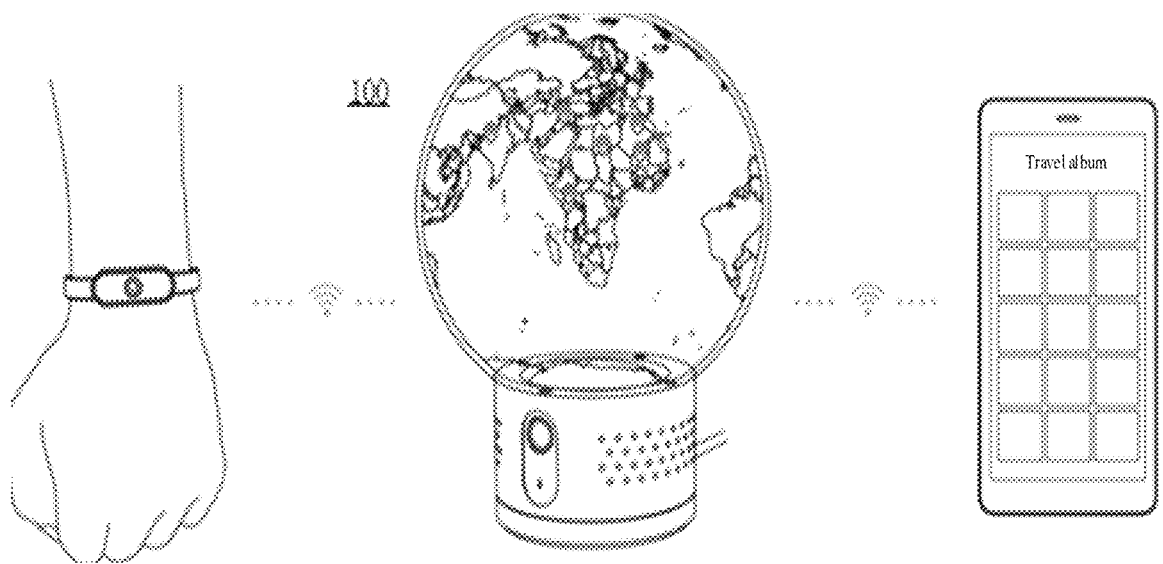
FIG. 7

SMART GLOBE AND CONTROL METHOD THEREFOR

CROSS-REFERENCE TO RELATED APPLICATION

This application claims priority to Chinese Patent Application No. 202010015242.3 filed on Jan. 7, 2020, the disclosure of which is hereby incorporated by reference in its entirety.

BACKGROUND

A globe can include a model of the earth to facilitate understanding the earth, and can be made by modeling the shape of the earth with a certain ratio. The globe is widely used in teaching, locating, decorations, and so on.

SUMMARY

The present disclosure relates generally to the field of electronics technologies, and more specifically to a smart globe, a control method for a smart globe, and a storage medium.

According to a first aspect of the present disclosure, there is provided a smart globe, including: a sphere whose interior is hollow; a projection module forming a projection image on an inner surface of the sphere; and a processor electrically connected to the projection module, wherein the processor controls the projection module based on received location information, to make the projection module display geographic information corresponding to the location information.

In some embodiments, a touch sensing module is disposed on the sphere, to generate a touch signal by sensing a touch action, the processor is electrically connected to the touch sensing module, and determines geographical information after a change operation is performed on the geographic information based on correspondence between the touch signal generated by the touch sensing module and the change operation on the geographic information.

In some embodiments, the smart globe further includes: a support base supporting the sphere, within which the projection module is disposed; a memory disposed within the support base and stored therein geographic information; and the processor is electrically connected with the memory.

In some embodiments, the smart globe further includes a voice module for receiving voice instructions; the voice module is connected to the processor; and the processor retrieves geographic information corresponding to the voice instruction based on the voice instruction, and projects the retrieved geographic information on the sphere by the projection module.

In some embodiments, the smart globe further includes a base; the base is provided with a rotating shaft and a motor that drives the rotating shaft to rotate; the motor is connected to the processor to control rotation of the motor; and the support base is disposed on the base and rotates relative to the base through the rotating shaft.

In some embodiments, the smart globe further includes a camera module disposed on the support base, and connected to the processor; the processor controls the support base to rotate relative to the base, to make the camera capture a location of a user, and the processor controls the projection module to make the geographic information that is projected and displayed, by the projection module, face the user.

In some embodiments, the smart globe further includes a wireless module disposed on the support base, and the smart globe synchronizes information with external devices through the wireless module.

In some embodiments, the processor receives information of the external device through the wireless module; and the processor makes the projection module display content corresponding to the information of the external device based on the received information of the external device.

According to second aspect of the present disclosure, there is provided a control method for a smart globe, the method including: obtaining display control information; determining geographic information displayed on the smart globe based on the display control information; and controlling a projection module of the smart globe to project and display the geographic information on a sphere of the smart globe.

In some embodiments, the display control information includes touch position information and touch gesture information inputted by a user on the sphere of the smart globe; determining geographic information displayed on the smart globe based on the display control information includes: determining initial geographic information displayed on the smart globe based on the touch position information; determining a change operation performed on the initial geographic information based on the touch gesture information, wherein there is one-to-one correspondence between the touch gesture and the change operation on the geographic information; and determining the geographic information after the change operation is performed on the initial geographic information as the geographic information displayed on the smart globe.

In some embodiments, the change operation includes one or more of zoom-in display of geographic information, zoom-out display of geographic information, and display content replacement of geographic information.

In some embodiments, the display control information includes voice instructions used to determine location information; determining geographic information displayed on the smart globe based on the display control information includes: determining the geographical information corresponding to the location information determined based on the voice instructions as the geographical information displayed on the smart globe.

In some embodiments, the method further includes: capturing user image information through a camera module; and adjusting the geographic information displayed on the sphere of the smart globe, based on a perspective by which the camera module has captured the user image information, to make the geographic information displayed on the sphere face the user.

In some embodiments, the method further includes: obtaining image information stored in an external device that communicates with the smart globe, the image information including geographic location information; and displaying, based on a marking operation of a user on the geographic location information, the mark on the sphere of the smart globe.

In some embodiments, the method further includes: storing the geographic location information with the mark.

In some embodiments, the method further includes: storing synchronously the geographic location information with the marking to a cloud server.

In some embodiments, the method further includes: determining time information of storing the geographic location information; and storing the time information.

In some embodiments, projecting to display the geographic information includes: obtaining target geographic location information based on a user operation; and projecting and displaying a marker corresponding to the target geographic location information, including one or more of landmark buildings, landmark animals, and landmark plants.

In some embodiments, projecting and displaying a marker in the geographic information includes: projecting and displaying the marker in the geographic information in a three-dimensional display mode.

According to a third aspect of the present disclosure, there is provided a control device for a smart globe, the device including: an obtaining component configured to obtain display control information; a determining component configured to determine geographic information displayed on the smart globe based on the display control information; and a controlling component configured to control a projection module of the smart globe to project and display the geographic information on a sphere of the smart globe.

In some embodiments, the display control information includes touch position information and touch gesture information inputted by a user on the sphere of the smart globe; the determining component is configured to determine geographic information displayed on the smart globe based on the display control information in the following manners: determining initial geographic information displayed on the smart globe based on the touch position information; determining a change operation performed on the initial geographic information based on the touch gesture information, wherein there is one-to-one correspondence between the touch gesture and the change operation on the geographic information; and determining geographic information after the change operation is performed on the initial geographic information as the geographic information displayed on the smart globe.

In some embodiments, the change operation includes one or more of zoom-in display of geographic information, zoom-out display of geographic information, and display content replacement of geographic information.

In some embodiments, the display control information includes voice instructions is used to determine location information; the determining component determines geographic information displayed on the smart globe based on the display control information in the following manner: determining the geographical information corresponding to the location information determined based on the voice instruction as the geographical information displayed on the smart globe.

In some embodiments, the device further includes: a capturing component configured to capture user image information through a camera module; and an adjusting component configured to adjust the geographic information displayed on the sphere of the smart globe based on a perspective by which the camera module has captured the user image information, to make the geographic information displayed on the sphere face the user.

In some embodiments, the obtaining component is further configured to obtain image information stored in an external device that communicates with the smart globe, including geographic location information; the determining component is further configured to display, based on a marking operation of a user on the geographic location information, the mark on the sphere of the smart globe; and the controlling component is further configured to display the mark on the sphere of the smart globe.

In some embodiments, the device further includes: a storing component configured to store the geographic location information with the mark.

In some embodiments, the device further includes: a synchronizing component configured to store synchronously the geographic location information with the mark to a cloud server.

In some embodiments, the determining component is further configured to determine time information of storing the geographic location information; and the storing component is further configured to store the time information.

In some embodiments, the controlling component projects and displays the geographic information in the following manners: obtaining target geographic location information based on a user operation; and projecting and displaying a marker corresponding to the target geographic location information, including one or more of landmark buildings, landmark animals, and landmark plants.

In some embodiments, the controlling component projects and displays the geographic information in a three-dimensional display mode.

According to a fourth aspect of the present disclosure, there is provided a control device for a smart globe, including: a processor; memory storing processor-executable instructions; wherein the processor is configured to: execute the control method according to the second aspect or any example of the second aspect as described above.

According to a fifth aspect of the present disclosure, there is provided a non-transitory computer-readable storage medium having stored therein computer-executable instructions that, when executed by a processor, execute the control method according to the second aspect or any example of the second aspect as described above.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

FIG. 6A is a first schematic diagrams illustrating changes in display states of the smart globe according to some embodiments.

FIG. 6B is a second schematic diagrams illustrating changes in display states of the smart globe according to some embodiments.

FIG. 6C is a third schematic diagrams illustrating changes in display states of the smart globe according to some embodiments.

FIG. 7 is a schematic diagram illustrating interactions between a smart globe and an external device according to some embodiments.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Augmented reality (AR) effects can be added to a traditional globe, and breaks through the limitation of single static state of the traditional globe. An application (APP) software can be installed in a terminal and associated with the AR globe. For example, when a mobile phone or tablet is picked up by a user, the camera can be turned on to aim at the globe, and the simulated earth can be displayed on the screen for the users to operate.

In this AR globe, users can only perform simulation operations on smart devices such as mobile phones or tablets, and cannot interact with the physical globe, lacking the sense of physical operation, and causing poor user experience.

According to the smart globe provided in the first aspect of embodiments of the present disclosure, the sphere of the smart globe cooperates with the projection module, and the projection module is controlled by the processor based on the received location information, to display geographic information corresponding to the location information on the sphere. It can be realized to interact with the globe so that the user can experience the physical operation sense of the smart globe, and user experience is enhanced.

Figure 1:
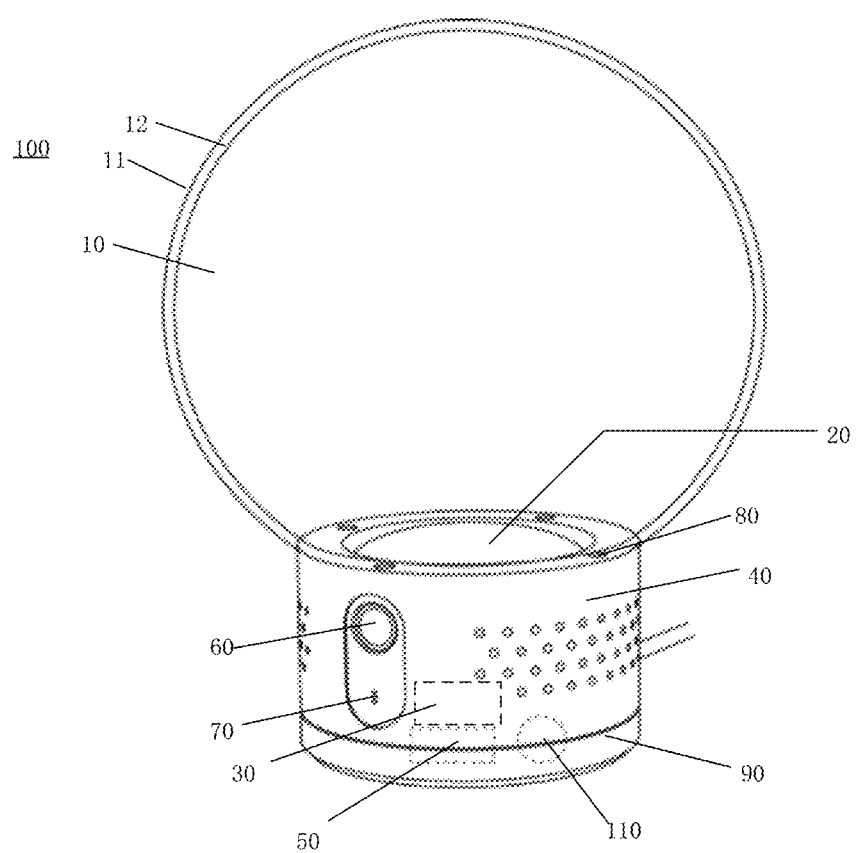
FIG. 1 is a schematic diagram illustrating a structure of a smart globe according to some embodiments.

FIG. 1 is a schematic diagram illustrating a structure of a smart globe according to some embodiments. As shown in FIG. 1, the smart globe 100 includes a sphere 10, a projection module 20 and a processor 30.

In some embodiments, the sphere 10 is a structure having an interior that is hollow, the projection module 20 forms a projection image on an inner surface of the sphere 10, and the processor 30 is electrically connected to the projection module 20. Herein, the processor 30 controls the projection module 20 based on received location information, to make the projection module 20 display geographic information corresponding to the location information. The geographic information can be a world map, a country, a city, humanity, landmark buildings, landmark animals, landmark plants, and so on.

Figure 3:
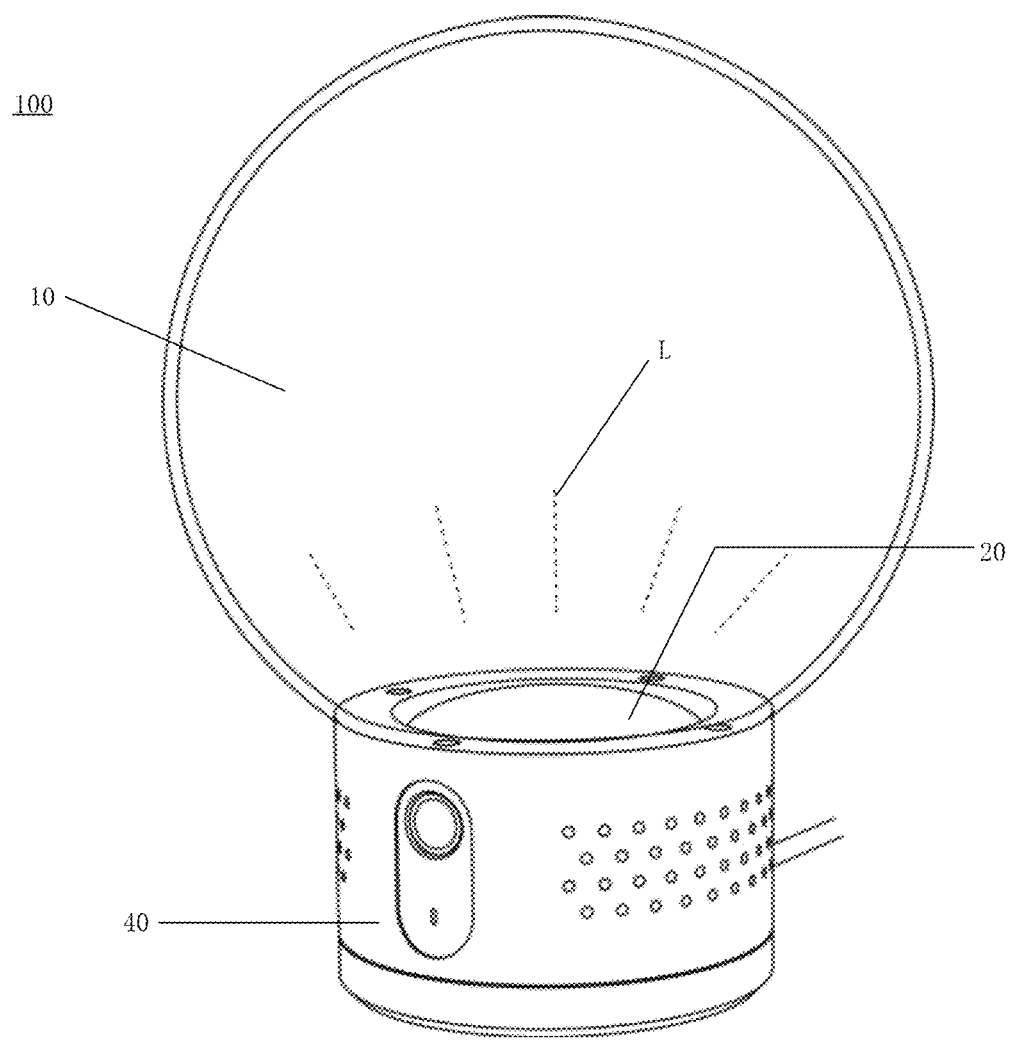
FIG. 3 is a schematic diagram illustrating a structure of a smart globe according to yet some other embodiments.

In this embodiment, the sphere 10 of the smart globe 100 cooperates with the projection module 20, and the projection module 20 is controlled by the processor 30 based on the received location information to display geographic information corresponding to the location information on the sphere 10. It can be realized to interaction with the globe 100, so that the user can experience the sense of physical operation, and user experience is enhanced. In addition, the light L emitted by the projection module 20 of the smart globe 100 can also be used as an indoor atmosphere lamp (as shown in FIG. 3).

In some embodiments, as shown in FIG. 1, a touch sensing module 11 is disposed on the sphere 10. Specifically, an outer surface of the sphere 10 can be covered with the touch sensing module 11 for sensing a touch action to generate a touch signal. A projection display layer 12 can be coated on an inner surface of the sphere 10 to display a projected image on the sphere 10.

The processor 30 is electrically connected to the touch sensing module 11, and determines geographical information after a change operation is performed on the geographic information, based on correspondence between the touch signal generated by the touch sensing module 11 and the change operation on the geographic information.

FIGS. 6A-6C are schematic diagrams illustrating changes in display states of the smart globe according to some embodiments.

Figure 5:
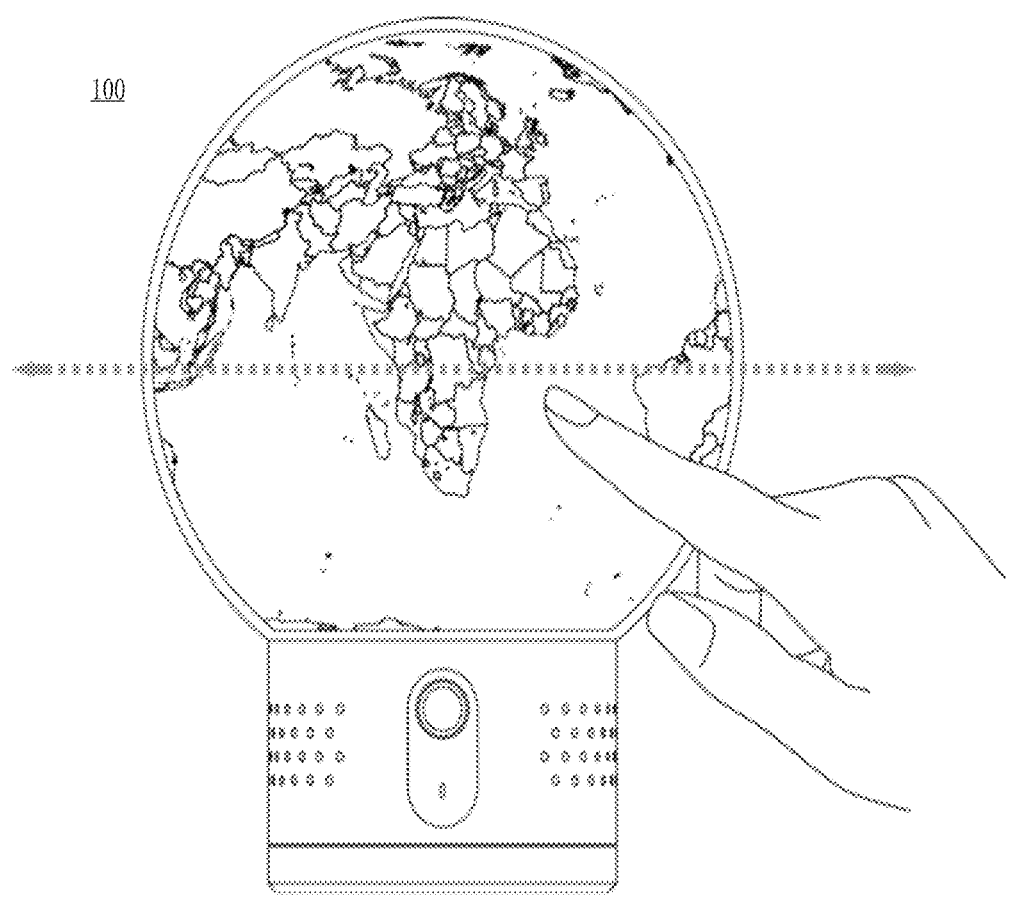
FIG. 5 is a schematic diagram illustrating interaction with a user on a smart globe according to some other embodiments.

In this embodiment, as shown in FIGS. 1, 5 and 6A-6C, for example, the user can slide or rotate the geographic information displayed on the sphere 10 by making a sliding gesture on the outer surface of the sphere 10 (as shown in FIG. 5). The user can also perform a zoom-in gesture by touching any position on the outer surface of the sphere 10 to enlarge the geographic information displayed on the sphere 10 for the user to zoom-in to view (as shown in FIG. 6A); when continuing the zoom-in action, the user can further zoom-in to view (as shown in FIG. 6B); when continuing to zoom-in to the maximum state, characteristics of the area can be displayed (as shown in FIG. 6C), such as landmark buildings, landmark animals, landmark plants, etc. The user is enabled to learn more relevant geographic information, and user experience is enhanced.

In some embodiments, as shown in FIG. 1, the smart globe 100 can further include a support base 40 and a memory 50.

The support base 40 is used to support the sphere 10, and the projection module 20 is disposed within the support base 40. Specifically, an opening is disposed on the bottom of the sphere 10, the sphere 10 is provided on the support base 40, and the sphere 10 is connected with the support base 40 through the opening on the bottom. The projection module 20 is located within the support base 40, projection lens of the projection module 20 can be a spherical wide-angle lens, and the projection lens is located within the opening on the bottom of the sphere 10 or protrudes toward inside of the sphere 10. The support base 40 and the sphere 10 can be integrally formed, or the support base 40 can be fixedly connected to the ball 10 in other ways.

The memory device 50 is disposed within the support base 40, the memory device 50 has stored therein geographic information, and the processor 30 is electrically connected to the memory 50.

Figure 2:
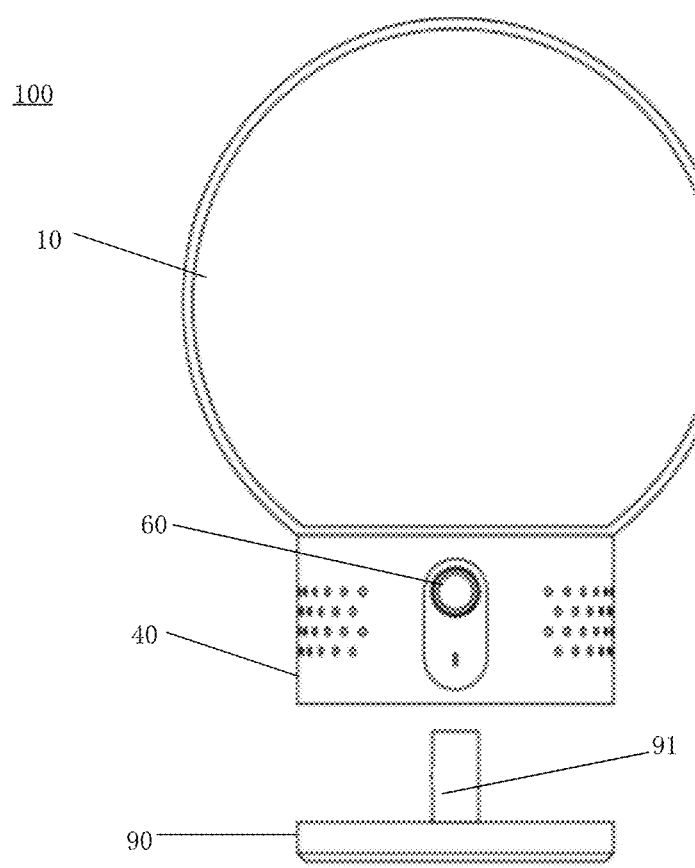
FIG. 2 is a schematic diagram illustrating a structure of a smart globe according to some other embodiments.

FIG. 2 is a schematic diagram of a structure illustrating a smart globe according to some other embodiments.

In some embodiments, as shown in FIGS. 1 and 2, the smart globe 100 can further include a base 90. The base 90 is provided with a rotating shaft 91 and a motor (not shown) that drives the rotating shaft 91 to rotate. The motor (not shown) is connected to the processor 30 to control rotation of the motor (not shown). The support base 40 is disposed on the base 90 and rotates relative to the base 90 through the rotating shaft 91.

In some embodiments, the smart globe 100 further includes a camera module 60. The camera module 60 is disposed on the support base 40, and the camera module 60 is connected to the processor 30. The processor 30 controls the support base 40 to rotate relative to the base 90 so that the camera module captures a position of a user, and the processor 30 controls the projection module 20 so that the geographic information projected and displayed by the projection module 20 faces the user.

In this embodiment, specifically, the motor (not shown) drives the rotating shaft 91 to rotate, thereby driving the support base 40 to rotate, the camera module 60 on the support base 40 acquires user photos, the processor 30 determines the position of the user based on the acquired user photos, and controls the projection module 20 to project and display the geographic information on the sphere 10 based on the position of the user, so that the geographic information faces the user.

Figure 4:
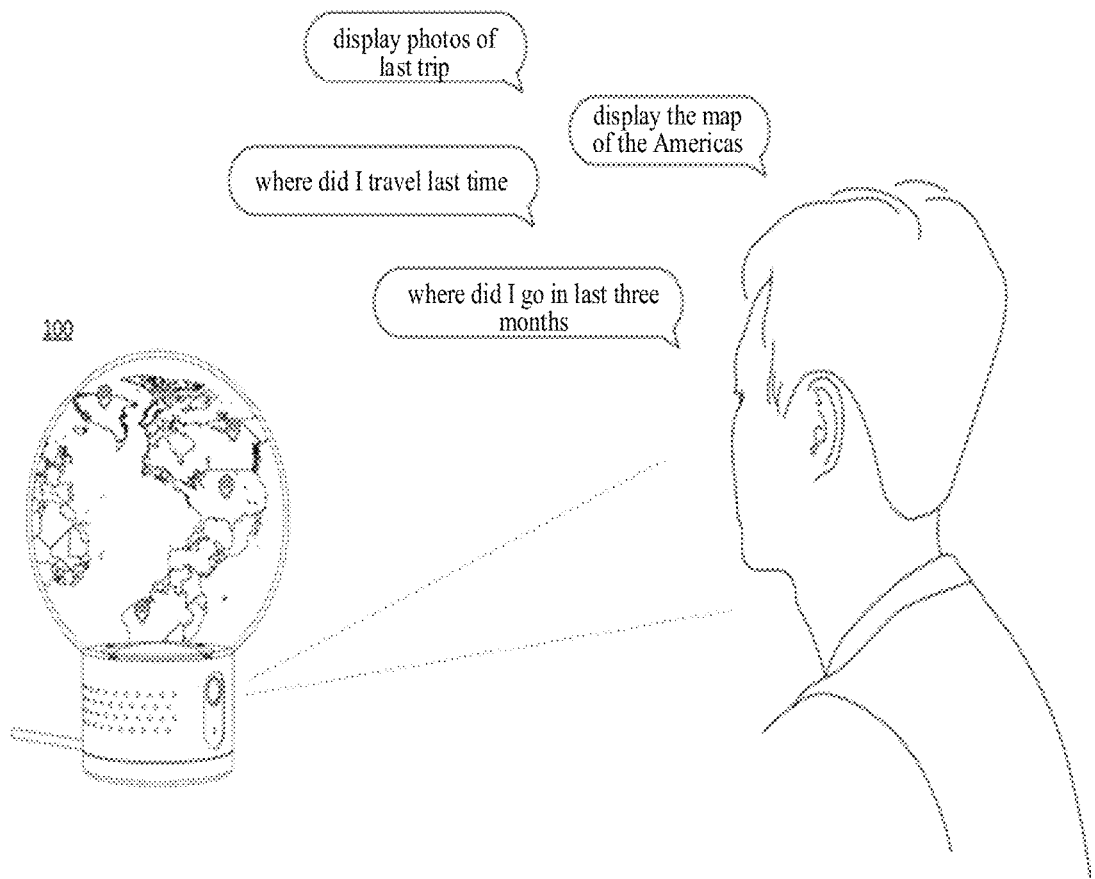
FIG. 4 is a schematic diagram illustrating interaction between a smart globe and a user according to some embodiments.

FIG. 4 is a schematic diagram illustrating interaction between a smart globe and a user according to some embodiments.

In some embodiments, as shown in FIGS. 2 and 4, the smart globe can further include a voice module 70 for receiving voice instructions, and the voice module 70 can be disposed on an outer side wall of the support base 40. The voice module 70 is connected to the processor 30. The processor 30 retrieves geographic information corresponding to the voice instructions based on the voice instructions, and projects the retrieved geographic information on the sphere 10 by the projection module 20. For example, the user sends voice instructions such as "display the photos of last trip," "display the map of the Americas," "where did I travel last time," and "where did I go in the last three months," etc. to the voice module 70, the processor 50 retrieves the geographic information corresponding to the voice instructions based on the voice instructions, and the retrieved "photos of trip," "map of the Americas," "last place to travel," and "where have been gone in the last three months" are projected on the sphere 10 by the projection module 20.

FIGS. 6A-6C are schematic diagrams illustrating changes in display states displayed on the smart globe according to some embodiments.

In some embodiments, as shown in FIGS. 1 and 6, the smart globe 100 can further include an action capture sensor 80. The action capture sensor 80 is used to capture a touch gesture action and generate a gesture signal. The processor controls zooming in or sliding of the geographic information displayed on the sphere based on the gesture signal. Specifically, a plurality of action capture sensors 80 can be arranged evenly on the support base 40, and each action capture sensor 80 is located within the sphere 10, the action capture sensor 80 plays an auxiliary role in the gesture action on the outer surface of the sphere 10, which can capture the touch gesture action more comprehensively and accurately.

FIG. 7 is a schematic diagram illustrating interaction between a smart globe and an external device according to some embodiments.

In some embodiments, as shown in FIGS. 1 and 7, the smart globe 100 further includes a wireless module 110. The wireless module 110 is disposed on the support base 40. The smart globe 100 synchronizes information with an external device through the wireless module 110.

In some embodiments, the processor 30 receives the information of the external device through the wireless module 110, and the processor 30 causes the projection module 20 to display content corresponding to the information of the external device based on the received information of the external device In this embodiment, the external device may be a smart phone, a tablet, a smart wearable device, or the like. For example, the smart globe 100 can establish a wireless connection with a smart phone through the wireless module 110, mark the travel place information in the user's smart phone on the globe, the user can also mark travel photos, videos and other information stored in the smart phone on the map and categorize them, and the storage of photos and videos in the globe and the storage of photos and videos in the cloud can be synchronized so as to facilitate query and recall.

The control method for a smart globe according to a second aspect of embodiments of the present disclosure can, by obtaining display control information on the globe, and determining geographic information displayed on the smart globe based on the obtained display control information, control the projection module of the smart globe to display geographic information on the sphere of the smart globe. It can be realized to interaction with the smart globe, so that the user can experience the sense of physical operation, and user experience is enhanced.

Figure 8:
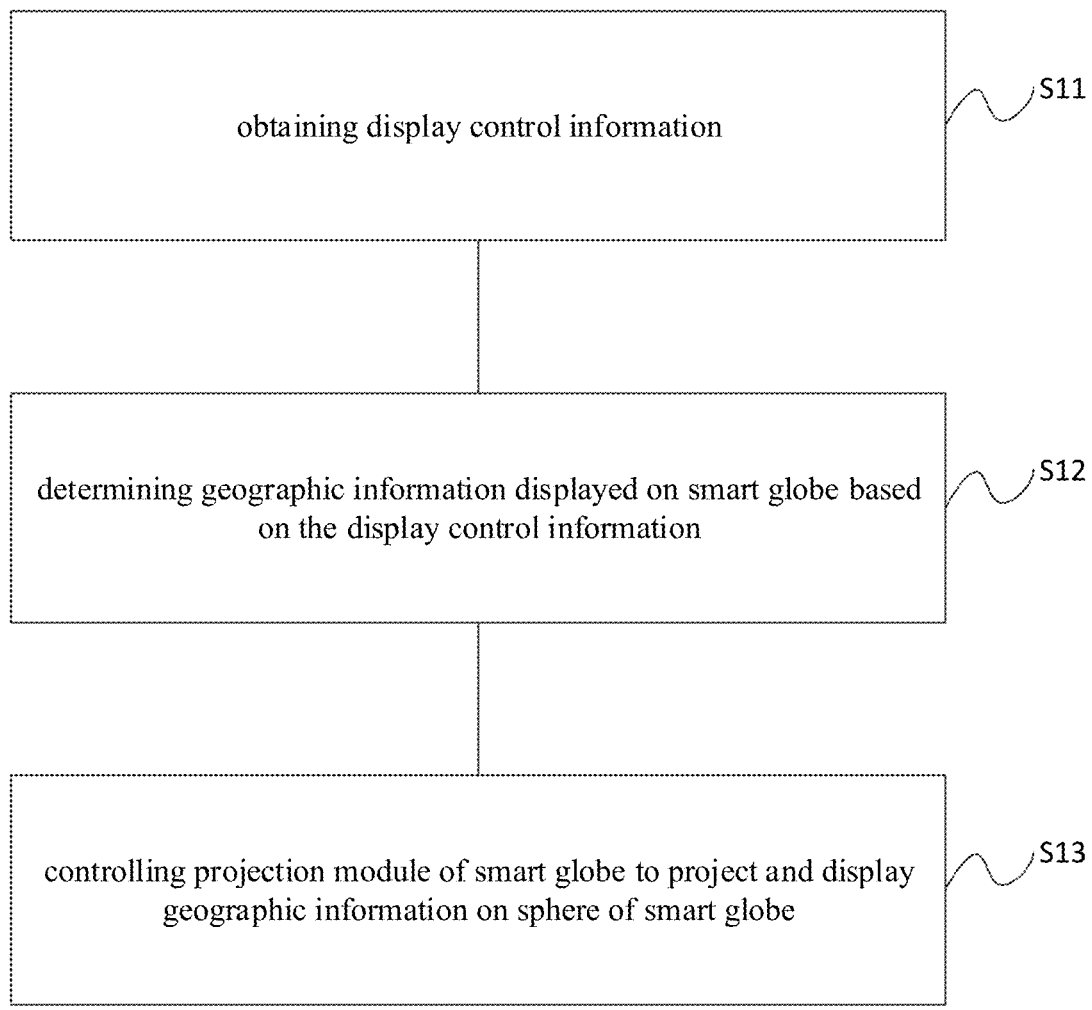
FIG. 8 is a flowchart illustrating a control method for a smart globe to display geographic information according to some embodiments.

FIG. 8 is a flowchart illustrating a control method for a smart globe to display geographic information according to some embodiments. As shown in FIG. 8, the method includes S11, S12, and S13.

In S11, display control information is obtained.

In S12, geographic information displayed on the smart globe is determined based on the display control information.

In S13, a projection module of the smart globe is controlled to project and display the geographic information on a sphere of the smart globe.

In this embodiment, by obtaining the display control information on the globe, and determining the geographical information displayed on the smart globe based on the obtained display control information, the projection module of the smart globe is controlled to project and display the geographical information on the sphere of the smart globe. It can be realized to interact with the smart globe, so that the user can experience the sense of physical operation, and user experience is enhanced.

Figure 9:
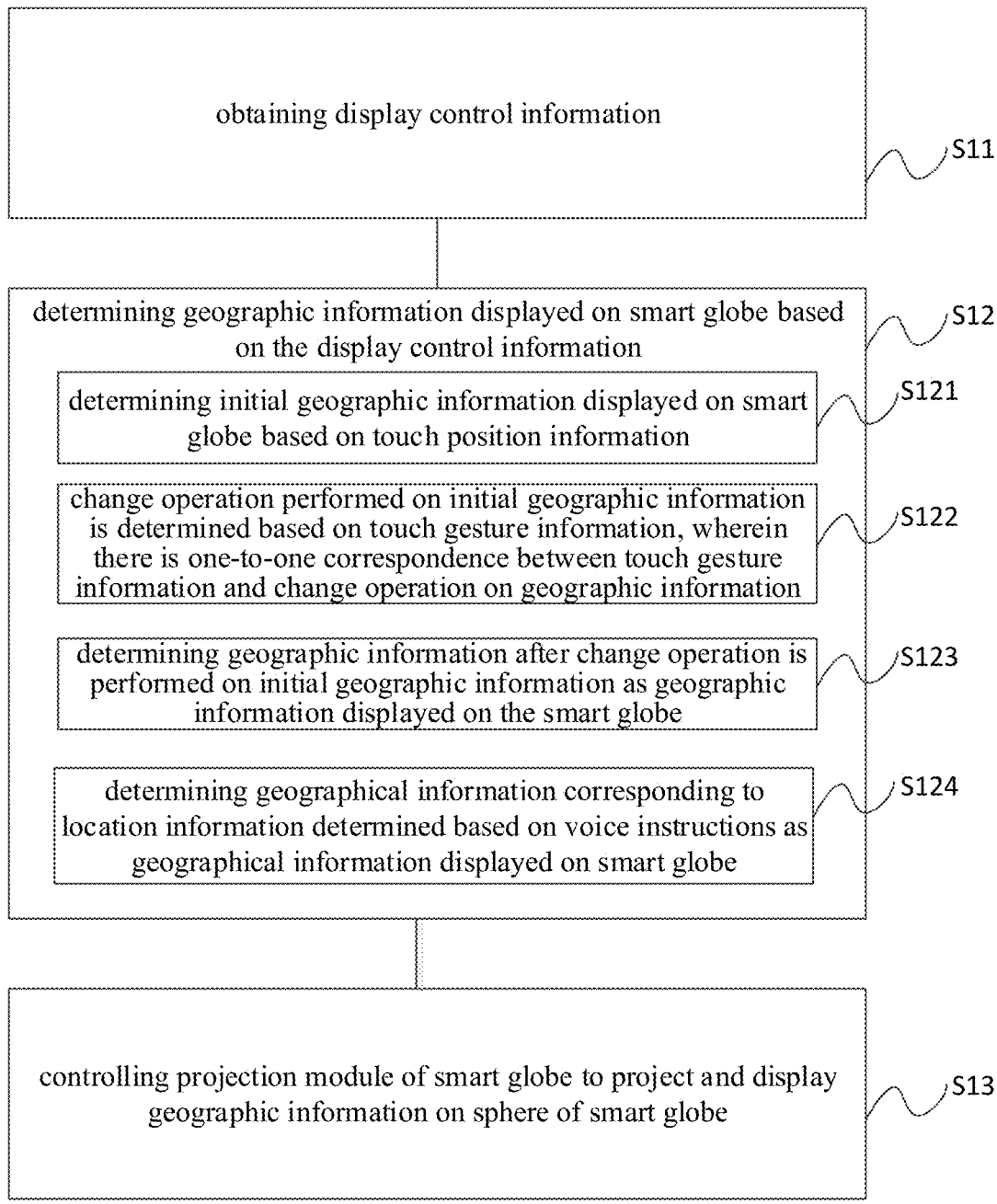
FIG. 9 is a flowchart illustrating a control method for a smart globe to display geographic information according to some other embodiments.

FIG. 9 is a flowchart illustrating a control method for a smart globe to display geographic information according to some other embodiments. As shown in FIG. 9, in some embodiments, the display control information can include touch position information and touch gesture information inputted by a user on the sphere of the smart globe, and S12 includes S121, S122, and S123.

In S121, initial geographic information displayed on the smart globe is determined based on the touch position information.

In S122, a change operation performed on the initial geographic information is determined based on the touch gesture information, wherein there is one-to-one correspondence between the touch gesture information and the change operation on the geographic information.

The touch gesture can be a zoom-in gesture, a zoom-out gesture, and a swiping gesture on the sphere of the smart globe. The initial geographic information displayed on the sphere follows the touch gesture operation to perform the change operation on the geographic information. The change operation may include one or more of zoom-in display of geographic information, zoom-out display of geographic information, and display content replacement of geographic information.

In S123, the geographic information after the change operation is performed on the initial geographic information is determined as the geographic information displayed on the smart globe.

In this embodiment, for example, users can make a sliding gesture by touching the sphere of the smart globe, which can make the geographic information displayed on the sphere slide or rotate (as shown in FIG. 5). The users can also perform a zoom-in gesture action on any position of the sphere that is touched to enlarge the geographic information displayed on the sphere for the user to zoom in to view (as shown in FIG. 6A); when continuing the zoom-in gesture action, the users can further zoom in to view (as shown in FIG. 6B); when continuing to zoom in to the maximum state, characteristics of the area can be displayed (as shown in FIG. 6C), such as landmark buildings, landmark animals, landmark plants, etc. The users can interact with the smart globe, can learn more relevant geographic information, and user experience is enhanced.

Figure 10:
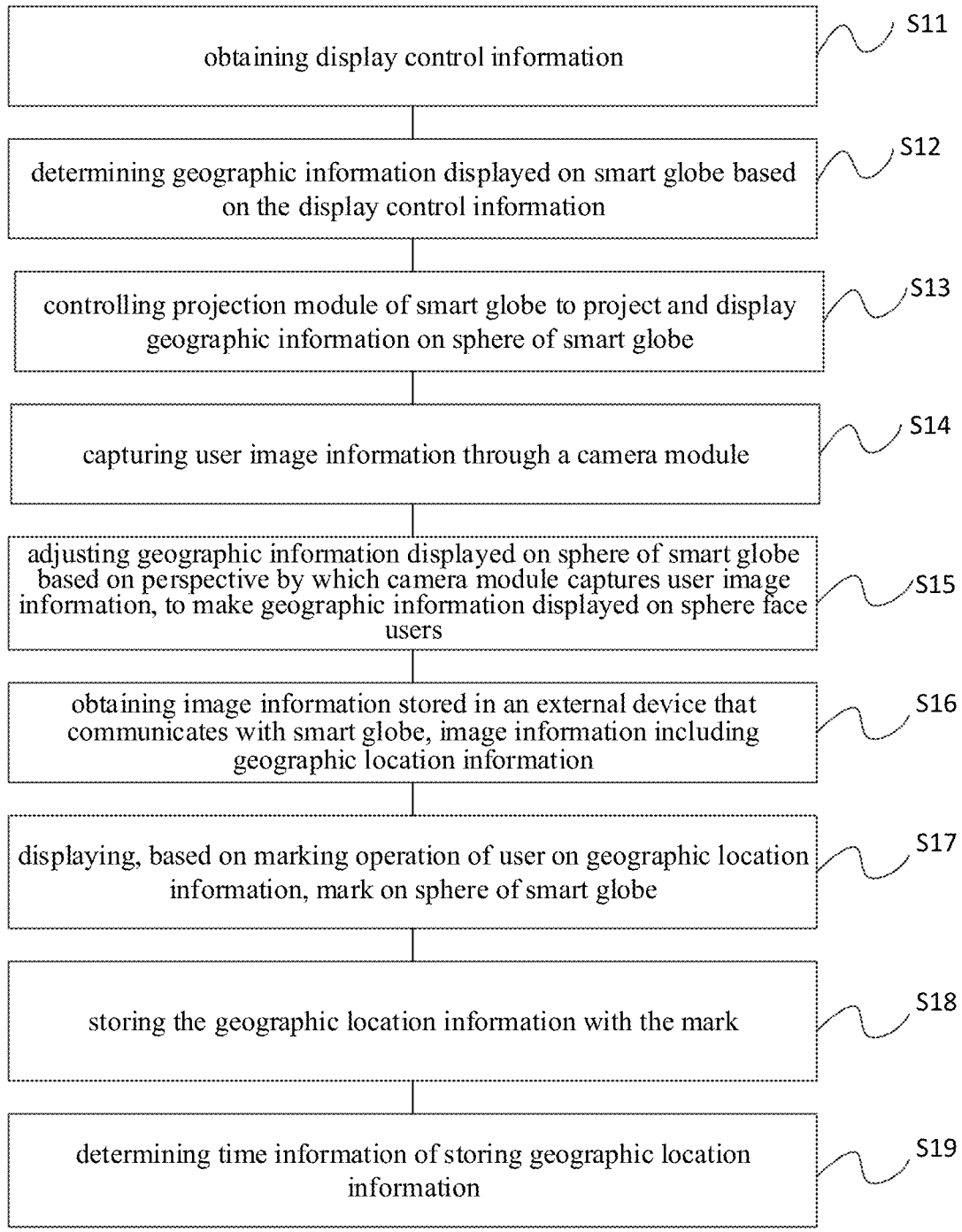
FIG. 10 is a flowchart illustrating a control method for a smart globe to display geographic information according to yet some other embodiments.

FIG. 10 is a flowchart illustrating a control method for a smart globe to display geographic information according to some other embodiments. As shown in FIG. 10, in some embodiments, the display control information can further include voice instructions used to determine location information.

S12 further includes S124, the geographical information corresponding to the location information determined based on the voice instructions is determined as the geographical information displayed on the smart globe in S124.

For example, the user sends an instruction "display America map" to the globe, and the "America map" is determined as the geographic information displayed on the smart globe based on the instruction.

In some embodiments, as shown in FIG. 10, the method further includes S14 and S15.

In S14, user image information is captured through a camera module.

In S15, the geographic information displayed on the sphere of the smart globe is adjusted based on a perspective by which the camera module has captured the user image information, to make the geographic information displayed on the sphere face users. It is convenient for the user to operate the geographic information displayed on the sphere.

In some embodiments, as shown in FIG. 10, the method further includes S16 and S17.

In S16, image information stored in an external device that communicates with the smart globe is obtained, the image information including geographic location information. The image information can be photos, videos, etc. with location information.

In S17, a mark is displayed on the sphere of the smart globe based on a marking operation of a user on the geographic location information.

In this embodiment, the smart globe can interact with external devices, and the user can mark the image information displayed on the sphere of the smart globe to facilitate user query.

In some embodiments, as shown in FIG. 10, the method further includes S18.

In S18, the geographic location information with the mark is stored.

The geographical location information with the mark can be stored in the memory on the smart globe, or stored synchronously to a cloud server. It is convenient for users to inquire and recall.

In some embodiments, as shown in FIG. 10, the method further includes S19.

In S19, time information of storing the geographic location information is determined; and the time information is stored.

By storing the geographic location information with time information, it is convenient to classify the marked geographic location information, which facilitates viewing. For example, it can be checked by the user where the user has been traveled last time and where the user has been in the last three months.

In some embodiments, projecting and displaying the geographic information can include: obtaining target geographic location information based on a user operation; projecting and displaying a marker corresponding to the target geographic location information, the marker can include one or more of landmark buildings, landmark animals, and landmark plants. The users are enabled to learn more relevant geographic and cultural information, and user experience is enhanced.

In some embodiments, a three-dimensional display mode can be adopted for projecting and displaying the marker in the geographic information. The visual impact effect is increased and user experience is enhanced.

Figure 11:
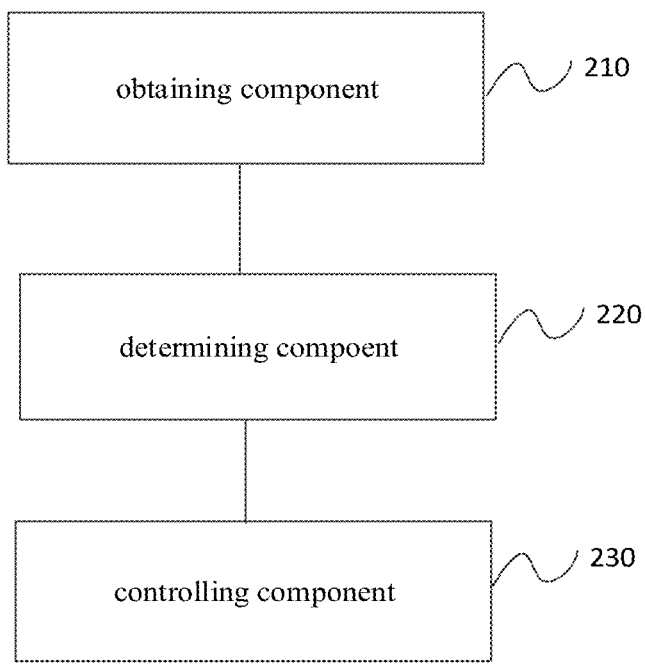
FIG. 11 is a flowchart illustrating a control device for a smart globe to display geographic information according to yet some other embodiments.

A control device for a smart globe is provided according to a third aspect of the embodiments of the present disclosure. FIG. 11 is a flowchart illustrating a control device for a smart globe to display geographic information according to some other embodiments. As shown in FIG. 11, the control device 200 includes:

an obtaining component 210 configured to obtain display control information;

a determining component 220 configured to determine geographic information to be displayed on the smart globe according to the display control information;

a controlling component 230 configured to control a projection module of the smart globe to project and display the geographic information on a sphere of the smart globe.

In this embodiment, the display control information on the globe is obtained by the obtaining component 210, the determining component 220 determines the geographic information displayed on the smart globe based on the obtained display control information, the controlling component 230 controls the projection module of the smart globe to project and display the geographic information on the sphere. It can be realized to interaction with the smart globe, so that the user can experience the sense of physical operation, and user experience is enhanced.

In some embodiments, the display control information includes touch position information and touch gesture information inputted by a user on the sphere of the smart globe; the determining component 220 is configured to determine geographic information displayed on the smart globe based on the display control information in the following manners:

determining initial geographic information to be displayed on the smart globe based on the touch position information;

determining a change operation performed on the initial geographic information based on the touch gesture information, wherein there is one-to-one correspondence between the touch gesture information and the change operation on the geographic information; and determining the geographic information after the change operation is performed on the initial geographic information as the geographic information displayed on the smart globe.

In this embodiment, the user can interact with the smart globe to learn more relevant geographic information, and user experience is enhanced.

In some embodiments, the change operation includes one or more of zoom-in display of geographic information, zoom-out display of geographic information, and display content replacement of geographic information.

In some embodiments, the display control information includes voice instructions used to determine location information;

the determining component 220 determines geographic information displayed on the smart globe based on the display control information in the following manner: determining the geographical information corresponding to the location information determined based pm the voice instructions as the geographical information displayed on the smart globe. The user can perform voice interaction with the smart globe.

Figure 12:
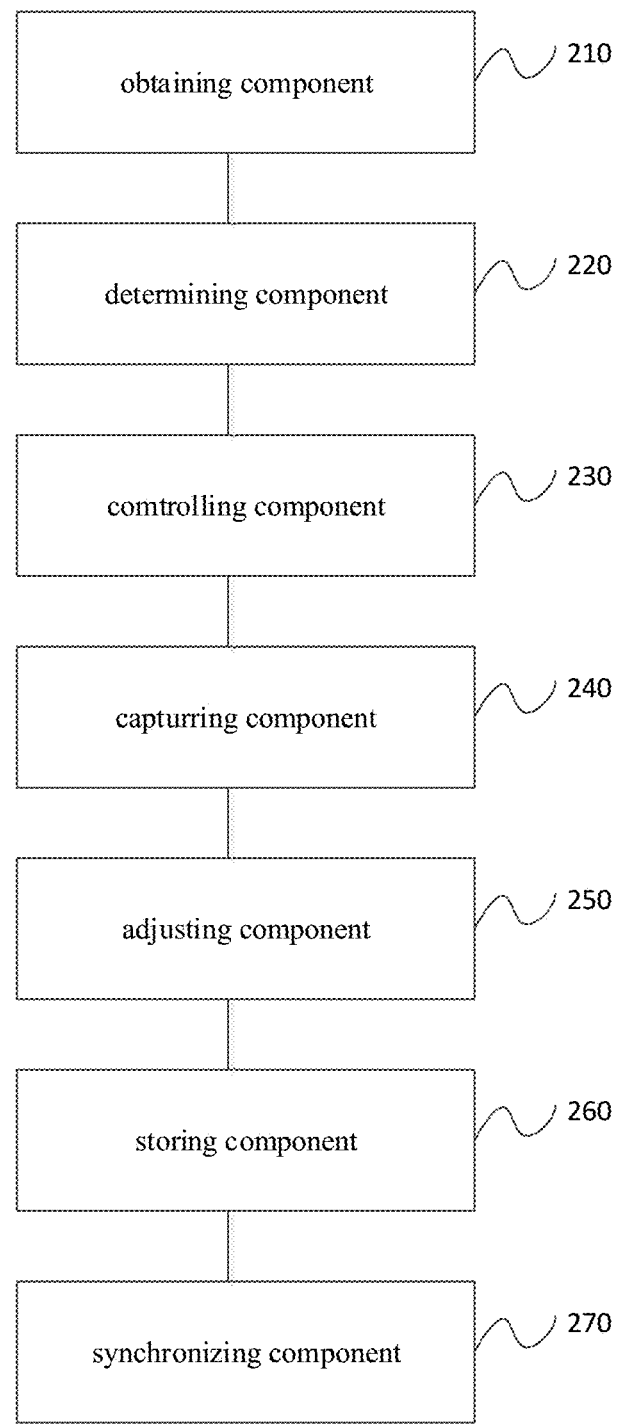
FIG. 12 is a block diagram illustrating a control device for a smart globe to display geographic information according to some embodiments.

FIG. 12 is a block diagram illustrating a control device for a smart globe to display geographic information according to some other embodiments. In some embodiments, as shown in FIG. 12, the device 200 further includes:

a capturing component 240 configured to capture user image information through a camera module;

an adjusting component 250 configured to adjust the geographic information displayed on the sphere of the smart globe based on a perspective by which the camera module has captured the user image information, to make the geographic information displayed on the sphere face a user. It is convenient for the user to operate the geographic information displayed on the sphere.

In some embodiments, the obtaining component 210 is further configured to: obtain image information stored in an external device that communicates with the smart globe, and the image information includes geographic location information;

the determining component 220 is further configured to: display, based on a marking operation of a user on the geographic location information, the mark on the sphere of the smart globe;

the control component 230 is further configured to: display the mark on the sphere of the smart globe.

In this embodiment, the smart globe can interact with an external device, and the user can mark the image information displayed on the sphere of the smart globe to facilitate user query.

In some embodiments, as shown in FIG. 12, the device 200 further includes: a storing component 260 configured to store the geographic location information with the mark.

In some embodiments, as shown in FIG. 12, the device 200 further includes: a synchronizing component 270 configured to store synchronously the geographic location information with the mark to a cloud server. The geographical location information with the mark can be stored in the memory on the smart globe, or synchronously stored to a cloud server. The interaction between the smart globe and the external device is realized, which facilitates user query and recall.

In some embodiments, the determining component 220 is further configured to: determine time information of storing the geographic location information;

The storage component 260 is further configured to store the time information.

In some embodiments, the control component 230 projects to display the geographic information in the following manners:

obtaining target geographic location information based on a user operation; and projecting and displaying a marker corresponding to the target geographic location information, the marker includes one or more of landmark buildings, landmark animals, and landmark plants. The users are enabled to learn more relevant geographic and cultural information, and user experience is enhanced.

In some embodiments, the control component 230 projects and displays the geographic information in a three-dimensional display mode. The visual impact effect is increased and user experience is enhanced.

Figure 13:
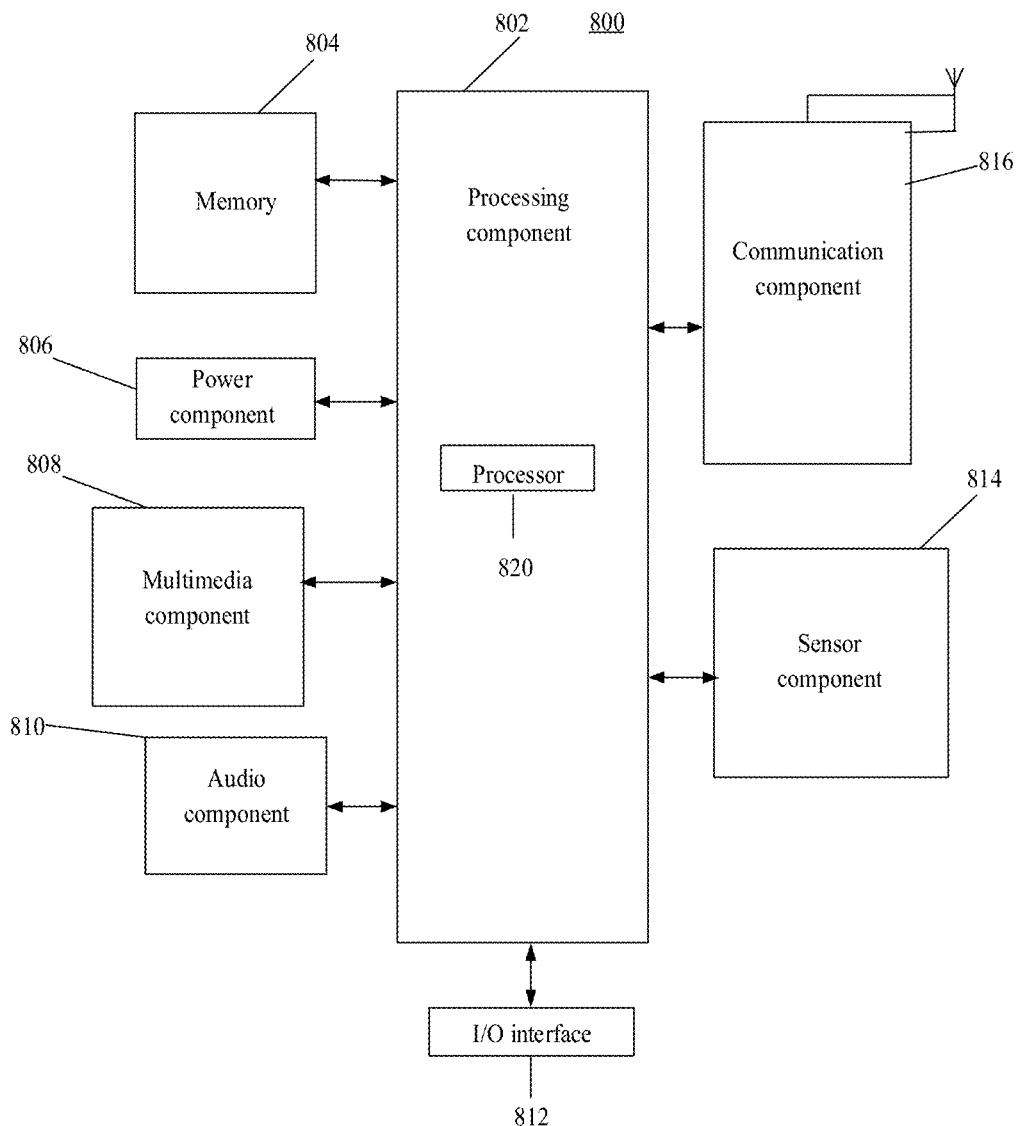
FIG. 13 is a block diagram illustrating a control device for a smart globe to display geographic information according to some embodiments.

FIG. 13 is a block diagram illustrating a control device 800 for a smart globe according to some embodiments. For example, the device 800 can be a mobile phone, a computer, a digital broadcast terminal, a messaging device, a gaming console, a tablet, a medical device, exercise equipment, a personal digital assistant, and the like.

Referring to FIG. 13, the device 800 can include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 can include one or more processors 820 to execute instructions to perform all or part of the steps in the above described methods. Moreover, the processing component 802 can include one or more modules which facilitate the interaction between the processing component 802 and other components. For instance, the processing component 802 can include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 can include a power management system, one or more power sources, and any other components associated with the generation, management, and distribution of power in the device 800.

The multimedia component 808 includes a screen providing an output interface between the device 800 and the user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 808 includes a front camera and/or a rear camera. The front camera and the rear camera can receive an external multimedia datum while the device 800 is in an operation mode, such as a photographing mode or a video mode. Each of the front camera and the rear camera can be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal can be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons can include, but are not limited to, a home button, a volume button, a starting button, and a locking button.

The sensor component 814 includes one or more sensors to provide status assessments of various aspects of the device 800. For instance, the sensor component 814 can detect an open/closed status of the device 800, relative positioning of components, e.g., the display and the keypad, of the device 800, a change in location of the device 800 or a component of the device 800, a presence or absence of user contact with the device 800, an orientation or an acceleration/deceleration of the device 800, and a change in temperature of the device 800. The sensor component 814 can include a proximity sensor configured to detect the presence of nearby objects without any physical contact. The sensor component 814 can also include a light sensor, such as a CMOS or CCD image sensor, for use in imaging applications. In some embodiments, the sensor component 814 can also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, 3G, 4G, 5G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 800 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 804, executable by the processor 820 in the device 800, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can have one or more of the following advantages.

The sphere of the smart globe cooperates with the projection module, and the projection module is controlled by the processor based on the received location information, to display geographic information corresponding to the location information on the sphere. It can be realized to interact with the globe so that the user can experience the physical operation sense of the smart globe, and user experience is enhanced.

The various device components, modules, units, blocks, or portions may have modular configurations, or are composed of discrete components, but nonetheless can be referred to as "modules" in general. In other words, the "components," "modules," "blocks," "Portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A smart globe, comprising:
   a sphere having an interior that is hollow;
   a projection module configured to form a projection image on an inner surface of the sphere;
   a support base supporting the sphere, within which the projection module is disposed;
   a memory device disposed at the support base and having geographic information stored therein;
   a base provided with a shaft, and a motor configured to drive the shaft to rotate; and
   a processor electrically coupled to the projection module and the memory device,
   wherein the processor is configured to control the projection module, based on received location information, to display geographic information corresponding to the location information,
   and control the motor to drive the shaft, and the support base is disposed on the base and configured to rotate relative to the base through the rotating shaft, and
   wherein the smart globe further comprises a camera module disposed on the support base, and coupled to the processor; and
   the processor is configured to control the support base to rotate relative to the base, to facilitate the camera module capturing a location of a user, and control the projection module to have the geographic information that is projected and displayed, by the projection module, face the user.

2. The smart globe according to claim 1, wherein
   a touch sensing module is disposed on the sphere, to generate a touch signal by sensing a touch action, and
   the processor is electrically coupled to the touch sensing module, and is configured to determine geographical information after a change operation is performed on the geographic information, based on correspondence between the touch signal generated by the touch sensing module and the change operation on the geographic information.

3. The smart globe according to claim 1, wherein
the smart globe further comprises a voice module configured to receive voice instructions;
the voice module is coupled to the processor; and
the processor is configured to retrieve geographic information corresponding to the voice instructions, and control the projection module to project the retrieved geographic information on the sphere.

4. The smart globe according to claim 1, wherein
the smart globe further comprises a wireless module disposed at the support base, and
the smart globe is configured to synchronize information with external devices through the wireless module.

5. The smart globe according to claim 4, wherein
the processor is configured to receive information of the external device through the wireless module; and
the processor is configured to make the projection module display content corresponding to the information of the external device based on the received information of the external device.

6. A control method for a smart globe, comprising:
obtaining display control information;
determining geographic information to be displayed on the smart globe based on the display control information; and
controlling a projection module of the smart globe to project and display the geographic information on a sphere of the smart globe;
controlling a support base supporting the sphere to rotate relative to a base provided with a shaft and a motor configured to drive the shaft to rotate, to facilitate a camera module disposed on the support base capturing a location of a user; and
controlling the projection module to have the geographic information that is projected and displayed, by the projection module, face the user.

7. The method according to claim 6, wherein
the display control information comprises touch position information and touch gesture information inputted by a user on the sphere of the smart globe; and
the determining geographic information displayed on the smart globe based on the display control information comprises:
determining initial geographic information displayed on the smart globe based on the touch position information;
determining a change operation performed on the initial geographic information based on the touch gesture information, wherein there is one-to-one correspondence between the touch gesture and the change operation on the geographic information; and
determining the geographic information after the change operation is performed on the initial geographic information as the geographic information displayed on the smart globe.

8. The method according to claim 7, wherein the change operation comprises one or more of zoom-in display of geographic information, zoom-out display of geographic information, and display content replacement of geographic information.

9. The method according to claim 6, wherein the display control information comprises voice instructions used to determine location information;
the determining geographic information displayed on the smart globe based on the display control information comprises:
determining the geographical information corresponding to the location information determined based on the voice instructions as the geographical information displayed on the smart globe.

10. The method according to claim 6, further comprising:
capturing user image information through a camera module; and
adjusting the geographic information displayed on the sphere of the smart globe, based on a perspective by which the camera module has captured the user image information, to make the geographic information displayed on the sphere face the user.

11. The method according to claim 6, further comprising:
obtaining image information stored in an external device that communicates with the smart globe, the image information comprising geographic location information; and
displaying, based on a marking operation of a user on the geographic location information, a mark on the sphere of the smart globe.

12. The method according to claim 11, further comprising at least one of:
storing the geographic location information with the mark; and
storing synchronously the geographic location information with the mark to a cloud server.

13. The method according to claim 12, further comprising:
determining time information of storing the geographic location information; and
storing the time information.

14. The method according to claim 6, wherein the controlling the projection module of the smart globe to project and display the geographic information on the sphere of the smart globe comprises:
obtaining target geographic location information based on a user operation; and
projecting and displaying a marker corresponding to the target geographic location information, comprising one or more of landmark buildings, landmark animals, and landmark plants.

15. The method according to claim 14, wherein the projecting and displaying a marker in the geographic information comprises:
projecting and displaying the marker in the geographic information in a three-dimensional display mode.

16. A control device of smart globe, comprising:
memory storing processor-executable instructions;
a processor configured to:
obtain display control information;
determine geographic information displayed on the smart globe based on the display control information;
control a projection module of the smart globe to project and display the geographic information on a sphere of the smart globe;
control a support base supporting the sphere to rotate relative to a base provided with a shaft and a motor configured to drive the shaft to rotate, to facilitate a camera module disposed on the support base capturing a location of a user; and control the projection module to have the geographic information that is projected and displayed, by the projection module, face the user.

17. A smart globe set comprising the smart globe of claim 1, further comprising:
- a microphone configured to received voice instructions corresponding to the location information;
- a touch sensor configured to generate a touch signal by sensing a touch action corresponding to the geographic information;
- a camera configured to capture a user location to facilitate the smart globe orienting toward the user location; and
- a mobile terminal configured to share the location information with the smart globe and control the projection module.

* * * * *